(12) United States Patent
Zeng et al.

(10) Patent No.: US 12,120,311 B2
(45) Date of Patent: Oct. 15, 2024

(54) ENCODER AND ASSOCIATED SIGNAL PROCESSING METHOD

(71) Applicant: Realtek Semiconductor Corp., HsinChu (TW)

(72) Inventors: Weimin Zeng, Milpitas, CA (US); Chi-Wang Chai, Cupertino, CA (US); Wei Li, Suzhou (CN); Wujun Chen, Suzhou (CN); Wei Pu, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 140 days.

(21) Appl. No.: 18/107,022

(22) Filed: Feb. 8, 2023

(65) Prior Publication Data

US 2024/0267528 A1    Aug. 8, 2024

(51) Int. Cl.
| | |
|---|---|
| *H04N 19/14* | (2014.01) |
| *H04N 19/169* | (2014.01) |
| *H04N 19/172* | (2014.01) |

(52) U.S. Cl.
CPC .......... *H04N 19/14* (2014.11); *H04N 19/172* (2014.11); *H04N 19/1883* (2014.11)

(58) Field of Classification Search
CPC ... H04N 19/14; H04N 19/172; H04N 19/1883
USPC .................................................. 375/240.02
See application file for complete search history.

(56) References Cited

U.S. PATENT DOCUMENTS

| | | | | |
|---|---|---|---|---|
| 2017/0006287 | A1* | 1/2017 | Subramanya | ........ H04N 19/124 |
| 2021/0185318 | A1* | 6/2021 | Zhu | ........................ H04N 19/19 |

FOREIGN PATENT DOCUMENTS

| | | |
|---|---|---|
| TW | 200612756 | 4/2006 |
| TW | 202239205 A | 10/2022 |

OTHER PUBLICATIONS

Jingning Han ,"A Technical Overview of AV1", arXiv, Feb. 8, 2021.

* cited by examiner

*Primary Examiner* — Allen C Wong
(74) *Attorney, Agent, or Firm* — Winston Hsu

(57) ABSTRACT

The present invention provides an encoder including a quantization circuit, an encoding circuit, an energy parameter calculation circuit and a quantization parameter determination circuit. The quantization circuit is configured to perform quantization operations on a plurality of CTUs in image data in sequence to generate quantized data respectively corresponding to the plurality of CTUs. The encoding circuit is configured to perform encoding operations on the quantized data of the plurality of CTUs in sequence to generate encoded data. The energy parameter calculation circuit is configured to receive the image data, and calculate a plurality of energy parameters respectively corresponding to the plurality of CTUs in the image data. The quantization parameter determination circuit is configured to determine a plurality of quantization parameters of the plurality of CTUs according to at least a portion of the plurality of energy parameters, for the quantization circuit to perform the quantization operations.

20 Claims, 5 Drawing Sheets

ENCODER AND ASSOCIATED SIGNAL PROCESSING METHOD

BACKGROUND OF THE INVENTION

1. Field of the Invention

The present invention relates to a video encoder.

2. Description of the Prior Art

The operations of bit rate control in an encoder can generally be divided into a constant bit rate (CBR) and a variable bit rate (VBR), wherein the CBR means that the output bit rate of the encoder is a fixed value, to facilitate transmission over a channel with a limited bandwidth; and the VBR means that the output bit rate of the encoder will be adjusted according to the signal complexity of the input source, to maintain the quality of the output image. However, due to the limited capacity of the buffer in the encoder, the above-mentioned CBR or VBR control method is difficult to be implemented in low-latency applications. Specifically, in the process of encoding each CTU (coding tree unit) in a frame, due to the difference in the contents of the frame, the number of bits in the encoded CTU will vary greatly. For example, CTUs with complex textures will have a high bit count after encoding, while CTUs with simple textures will have a low bit count after encoding. Therefore, if the quantization parameter of the CTU with complex textures is not properly set, the number of bits of the encoded CTU may exceed an upper limit of the buffer capacity of the encoder, resulting in the inability to effectively control the bit rate.

SUMMARY OF THE INVENTION

It is therefore an objective of the present invention to provide an encoder and associated signal processing method, which limits a number of bits of the encoded CTU by determining the quantization parameter of each CTU, and effectively controls the output bit rate of the encoder, to solve the above-mentioned problems.

According to one embodiment of the present invention, an encoder comprising a quantization circuit, an encoding circuit, an energy parameter calculation circuit and a quantization parameter determination circuit is disclosed. The quantization circuit is configured to perform quantization operations on a plurality of CTUs in image data in sequence to generate quantized data respectively corresponding to the plurality of CTUs. The encoding circuit is configured to perform encoding operations on the quantized data of the plurality of CTUs in sequence to generate encoded data. The energy parameter calculation circuit is configured to receive the image data, and calculate a plurality of energy parameters respectively corresponding to the plurality of CTUs in the image data. The quantization parameter determination circuit is configured to determine a plurality of quantization parameters of the plurality of CTUs according to at least a portion of the plurality of energy parameters, for the quantization circuit to perform the quantization operations on the plurality of CTUs in sequence.

According to one embodiment of the present invention, a signal processing method of an encoder comprises the steps of: receiving image data, and calculating a plurality of energy parameters respectively corresponding to a plurality of CTUs in the image data; determining a plurality of quantization parameters of the plurality of CTUs according to at least a portion of the plurality of energy parameters; using the plurality of quantization parameters to sequentially perform quantization operations on the plurality of CTUs to generate quantized data respectively corresponding to the plurality of CTUs; and performing encoding operations on the quantized data of the plurality of CTUs in sequence to generate encoded data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
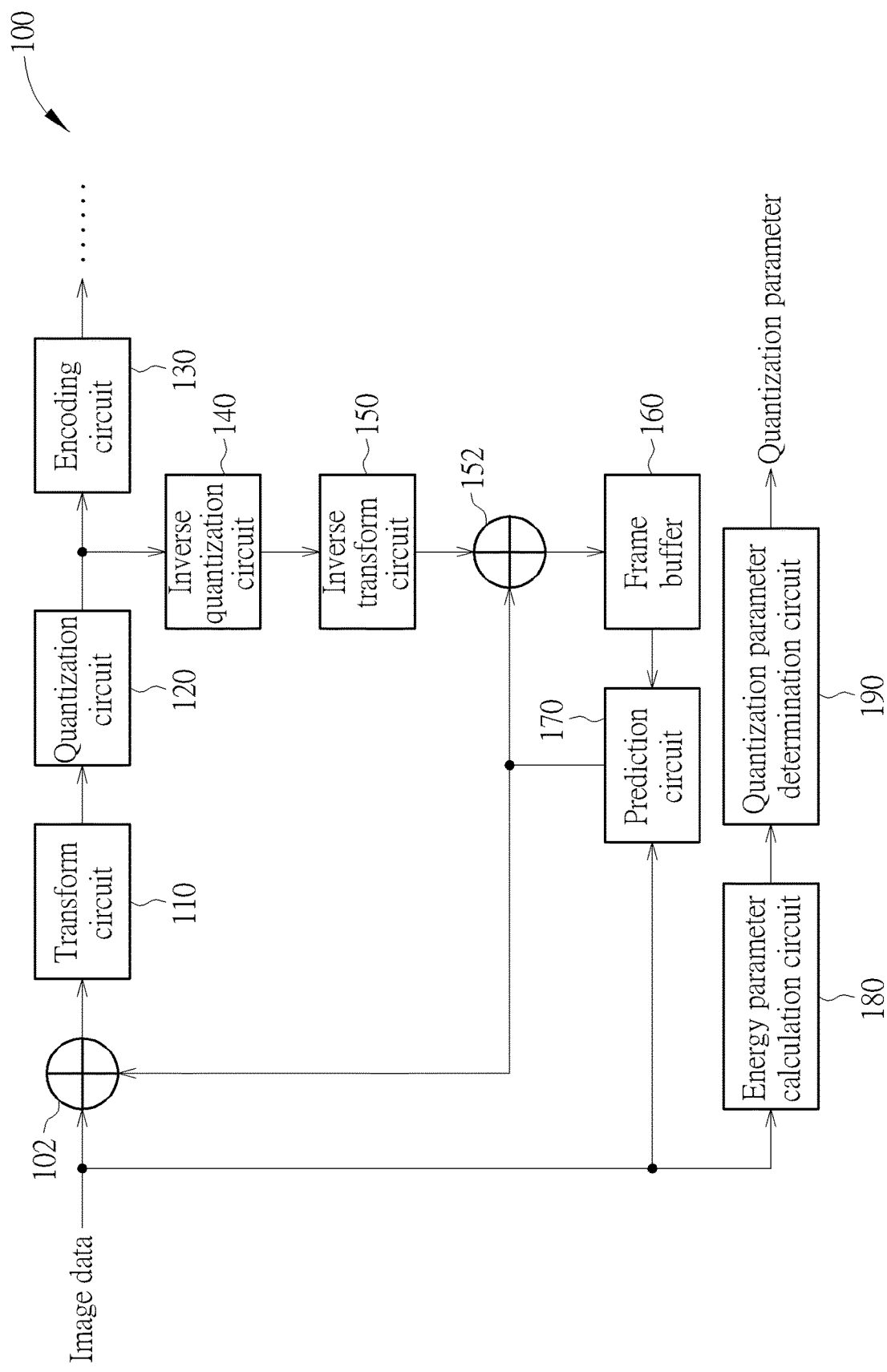
FIG. 1 is a diagram illustrating an encoder according to one embodiment of the present invention.

FIG. 1 is a diagram illustrating an encoder 100 according to one embodiment of the present invention. As shown in FIG. 1, the encoder 100 comprises a calculation circuit 102, a transform circuit 110, a quantization circuit 120, an encoding circuit 130, an inverse quantization circuit 140, an inverse transform circuit 150, a calculation circuit 152, a frame buffer 160, a prediction circuit 170, an energy parameter calculation circuit 180 and a quantization parameter determination circuit 190. In this embodiment, embodiment, the encoder 100 supports the AV1 (AOMedia Video 1) video coding format formulated by Alliance for Open Media (AOMedia).

In the main operation of the encoder 100, the prediction circuit 170 is arranged to receive external image data (e.g. the image frame) and an interpolated frame or adjusted image data that are generated inside the encoder 100, to generate predicted image data and the residual error data. Specifically, the prediction circuit 170 may be arranged to divide the received frame into multiple blocks, and perform inter-frame prediction, intra-frame prediction, motion estimation, and/or motion compensation upon the multiple blocks, to generate the predicted image data, for the calculation circuit 102 to calculate the residual error data corresponding to the multiple blocks. Then, the transform circuit 110 performs discrete cosine transform (DCT) upon the multiple residual error data, to transform the residual error data into frequency-domain data. Afterward, the quantization circuit 120 performs a quantization operation upon the frequency-domain data generated by the transform circuit 110, to generate quantized data, wherein the quantization operation of each frame corresponds to a quantization parameter. The encoding circuit 130 is arranged to process the quantized data to generate encoded data, and transmit the encoded data to a decoder (not shown) through the back-end channel. In addition, the inverse quantization circuit 140 is arranged to perform an inverse quantization operation upon the quantized data generated by the quantization circuit 120, and the inverse transform circuit 150 is arranged to perform an inverse transform operation (e.g. an inverse DCT) upon an output of the inverse quantization circuit 140, to generate an inverse transformed residual error data. Afterward, the calculation circuit 152 adds the inversely transformed residual error data generated by the inverse transform circuit 150 and the predicted image data generated by the prediction circuit 170 to generate adjusted image data, and stores the adjusted image data in the frame buffer 160 for use by the prediction circuit 170.

It is noted that, the operations of the calculation circuit 102, the transform circuit 110, the quantization circuit 120, the encoding circuit 130, the inverse quantization circuit 140, and the inverse transform circuit 150, the calculation circuit 152, the frame buffer 160 and the prediction circuit 170 in the encoder 100 are well known to those with ordinary skill in the art, and the focus of the present invention is on the energy parameter calculation circuit 180 and the quantization parameter determination circuit 190. Therefore, the following content mainly describes the energy parameter calculation circuit 180 and the quantization parameter determination circuit 190.

Figure 2:
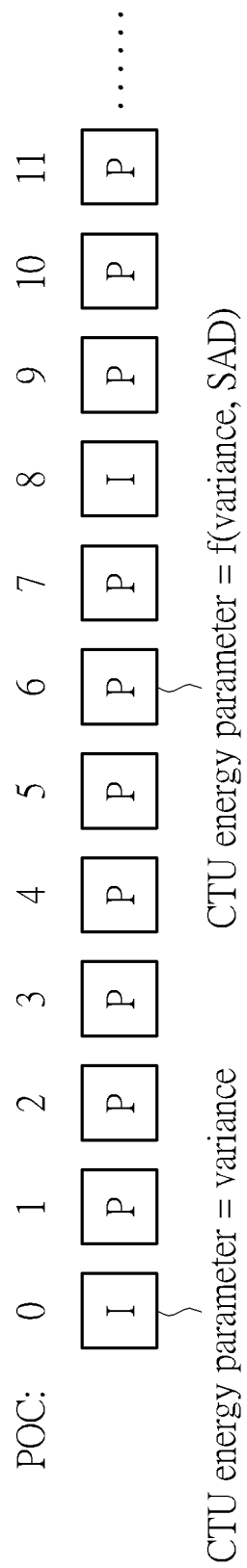
FIG. 2 is diagram showing a plurality of frames received by the encoder and calculations of energy parameters of different CTUs.

In the AV1 video coding format, a variety of coding units with different sizes are specified, wherein the largest coding unit can be called a coding tree unit (CTU) or a super block, and its size can be 128*128 pixels or 64*64 pixels. In the operation of energy parameter calculation circuit 180, the energy parameter calculation circuit 180 can calculate an energy parameter of each CTU in each frame. For example, referring to FIG. 2, the image data received by the encoder 100 includes multiple frames, such as the frames with picture order count (POC) 1-12 shown in FIG. 2, and the multiple frames include intra-frames (I-frame) and predicted frames (P-frame). For each CTU in the I-frame, the energy parameter calculation circuit 180 can calculate a variance of pixel values in the CTU as the energy parameter of the CTU, wherein the variance can be obtained by subtracting a square of a mean value of the pixel values from a mean value of the square of the pixel value in the CTU, but the present invention is not limited thereto. In addition, for each CTU in the P-frame, the energy parameter calculation circuit 180 can calculate the variance and a sum of absolute difference (SAD) according to the pixel values in the CTU, wherein the SAD is obtained by adding up each absolute difference between each pixel value in the CTU and a corresponding pixel value in a reference frame. Then, the energy parameter calculation circuit 180 performs a weighted summation on the variance of the pixel values in the CTU and the SAD to obtain the energy parameter of the CTU in the P-frame.

After determining the energy parameter of the CTU, the quantization parameter determination circuit 190 determines the quantization parameter for use by the quantization circuit 120 according to the energy parameter of the CTU and other related information, so as to use the most suitable quantization parameter to quantize the CTU.

Figure 3:
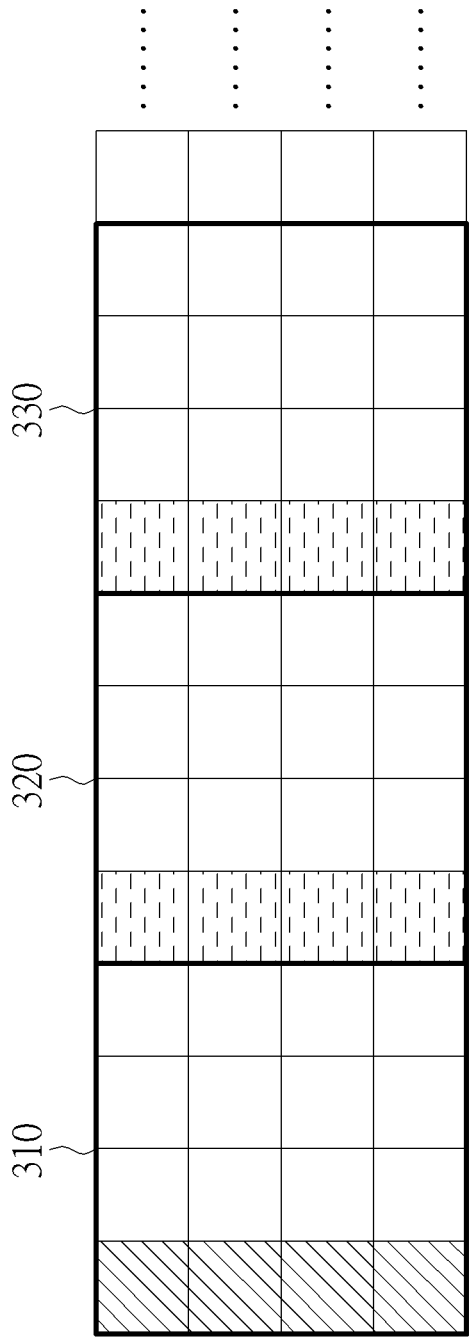
FIG. 3 is a diagram of a CTU set and a quantization parameter determination method adopted by different CTUs according to one embodiment of the present invention.

Specifically, referring to FIG. 3, the quantization parameter determination circuit 190 forms multiple CTUs into a CTU set, for example, N*M CTUs form a set, where N and M can be any value greater than or equal to 2. In the embodiment shown in FIG. 3, a CTU set is formed by 4*4 CTUs for illustration, wherein a CTU set 310 is located at the far left of the frame, that is, the left side of CTU set 310 does not have any CTU.

As described in the prior art, due to the limited capacity of the buffer in the encoder 100, the number of bits of the encoded CTU with complex texture may exceed an upper limit of the buffer capacity of the encoder 100 in low-latency applications. In order to solve this problem, a bit rate control of the encoder 100 is carried out in units of each row, so that the bit rate or the number of bits of each row is controlled within a range after encoding, wherein the above-mentioned "each row" refers to a row of CTU sets, that is, CTU sets 310, 320, 330 shown in FIG. 3, . . . , to the CTU set on the far right of the frame. In addition, the quantization parameter determination circuit 190 adjusts the quantization parameter of each CTU according to the bit rate of each row or the number of bits after encoding, so that after the CTU is processed by the quantization circuit 120 and the encoding circuit 130, the number of bits of the generated encoded data will not exceed the capacity of the buffer. In this embodiment, the quantization parameter used by the quantization circuit 120 can be adjusted between 0 and 255, and the smaller the quantization parameter, the quantized data generated by the quantization circuit 120 will have a larger amount of data after encoding by the encoding circuit 130. Similarly, the larger the quantization parameter, the quantized data generated by the quantization circuit 120 will have a smaller amount of data after being encoded by the encoding circuit 130. Therefore, the bit rate or output bit number of the encoding circuit 130 can be effectively controlled by adjusting the quantization parameter.

Specifically, the quantization parameter determination circuit 190 may have different quantization parameter determination methods for different CTU sets or different CTUs in a CTU set. In this embodiment, the CTUs of the first column in the CTU set 310 can adopt a row-level quantization parameter determination method, the CTUs of other rows in the CTU set 310 can adopt a CTU-level quantization parameter determination method, the CTUs of a first column in the CTU sets 320 and 330 can adopt a CTU set-level quantization parameter determination method, and the CTUs of other columns in the CTU sets 320 and 330 can be determined by using the CTU-level quantization parameter determination method. The details of the above three quantization parameter determination methods are described as follows.

In the row-level quantization parameter determination method, for any CTU in the first row of CTU set 310, the quantization parameter of the CTU can be calculated according to a target number of bits of this row after encoding and an average value of the energy parameters of the CTUs in this row. For example, the quantization parameter of CTU can be calculated by using the following formula:

$$\text{current\_row\_qp} = -53.65 * \log(\text{target\_row\_size}/\text{avg\_row\_energy}) + 500;$$

wherein "current_row_qp" is the quantization parameter corresponding to any CTU in the first column of CTU set 310, "target_row_size" is a sum of the target number of bits of all CTUs, after encoding, on the row to which the CTU set 310 belongs, and "avg_row_energy" is an average value of energy parameters of all CTUs on the row to which CTU set 310 belongs.

Figure 4:
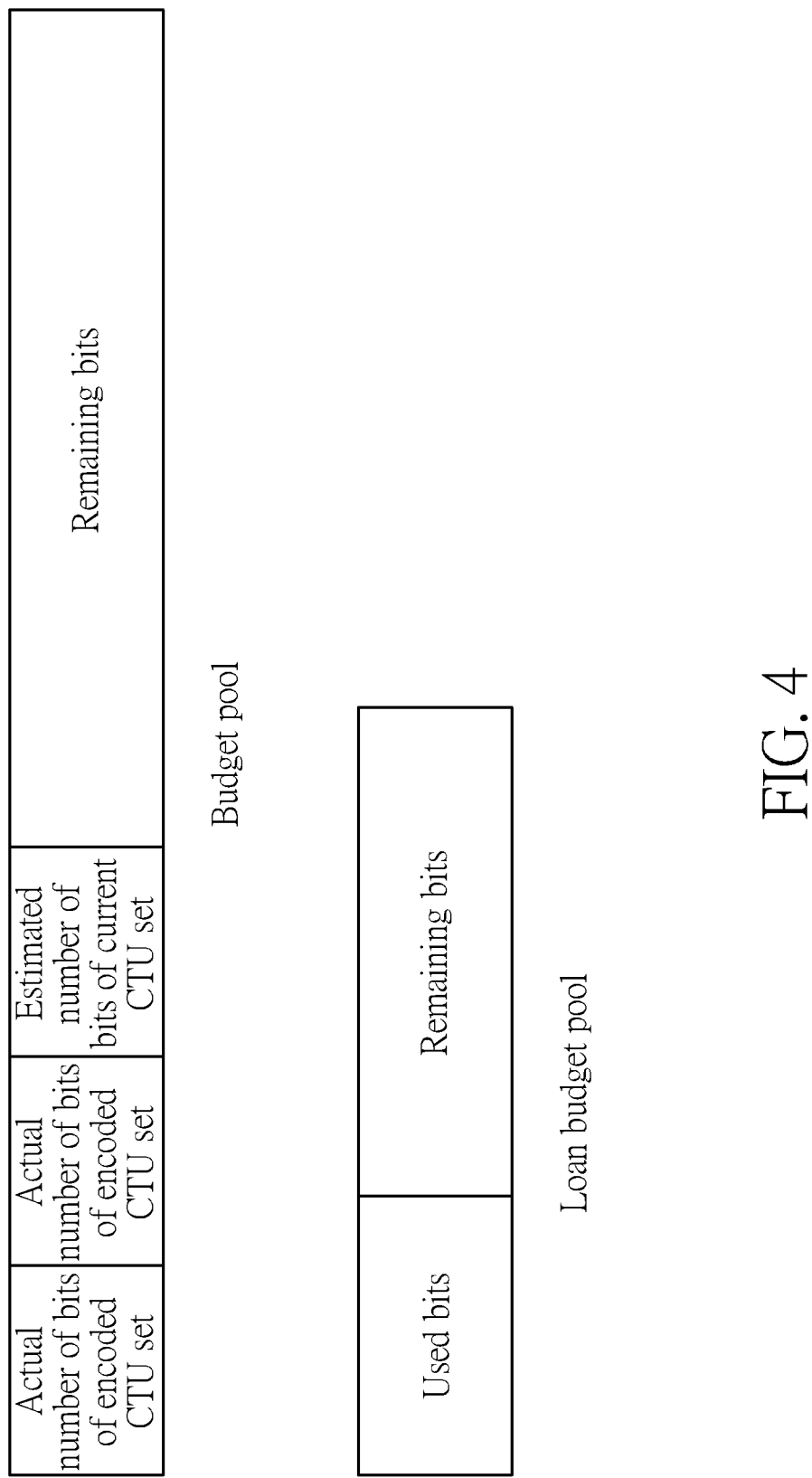
FIG. 4 shows a budget pool and a loan budget pool.

In the CTU set-level quantization parameter determination method, in addition to its own energy parameters, it will also dynamically adjust the quantization parameter through the actual number of bits of the encoded data generated by the previous CTU set after encoding, wherein "the previous CTU set" refers to the CTU set immediately to the left of the current CTU set. Take the CTU set 310 and 320 shown in FIG. 3 as an example, the encoder 100 establishes a budget pool and a loan budget pool as shown in FIG. 4 in the internal buffer, where the budget pool is a sum of the target number of bits of all CTUs, after encoding, on the row to which the CTU set 310 belongs, that is, the above-mentioned "target_row_size". The loan budget pool is the number of bits that CTU set 310 can borrow from other CTU sets when encoding, and it can also be estimated based on the above "target_row_size", for example, one-eighth of "target_row_size". In detail, the CTU set 310 includes 16 CTUs, and these 16 CTUs will be encoded in order to generate corresponding encoded data. In the process of encoding the CTU set 310, the encoding circuit 130 will allocate a part of the number of bits in the budget pool for use by the CTU set 310, and this part of the number of bits can be called an estimated number of bits of the CTU set 310 after encoding. Then, if the actual number of bits of the encoded data of CTU set 310 exceeds the estimated number of bits, it is necessary to borrow the number of bits from the loan budget pool to fill the excess; and if the actual number of bits of the encoded data of CTU set 310 is lower than the estimated number of bits, the remaining bits can be filled into the loan budget pool. In addition, after the CTU set 310 completes the encoding, the budget pool will update its contents according to the actual number of bits of the encoded data of the CTU set 310.

The above-mentioned budget pool or loan budget pool can be used to know the relationship between the quantization parameters currently used by the current CTU set 310 and ideal quantization parameters. Specifically, when all of 16 CTUs in the CTU set 310 have been encoded, if the loan budget pool lent the number of bits, or the actual number of bits of the encoded data of the CTU set 310 is greater than the estimated number of bits (i.e., the number of remaining bits in the budget pool is reduced), it means that the quantization parameters used by the CTU set 310 during processing through the quantization circuit 120 are relatively small as a whole, so the quantization parameter determination circuit 190 will increase the quantization parameter of the CTUs of the first column in the next CTU set (i.e., the CTU set 320). Similarly, if the remaining bits of the loan budget pool increases, or the actual number of bits of the encoded data of the CTU set 310 is lower than the estimated number of bits (i.e., the number of remaining bits in the budget pool is increased), it means that the quantization parameters used by the CTU set 310 during processing through the quantization circuit 120 are relatively large as a whole, so the quantization parameter determination circuit 190 will decrease the quantization parameter of the CTUs of the first column in the next CTU set (i.e., the CTU set 320). In one embodiment, the quantization parameter "CTU_set_base_qp" used by the CTU of the first column in the CTU set 320 can be determined according to the "current_row_qp" used by the CTUs of the first column in the CTU set 310 and be adjusted by using contents of the above-mentioned budget pool or loan budget pool.

In one embodiment, if the energy parameter of the CTU set to be encoded is greatly increased or decreased compared with the energy parameter of the previous CTU set, the quantization parameter determination circuit 190 can further determine the quantization parameter "CTU_set_base_qp" used by the CTUs of the first column in the CTU set 320 according to the energy parameters of the CTU set currently to be encoded (for example, the sum or average value of the energy parameters of all CTUs in the CTU set 320). Specifically, if the energy parameter of the CTU set is greater than the energy parameter of the previous CTU set plus a threshold value, a larger one between "CTU_set_base_qp" of the previous CTU set and "current_row_qp" of the first CTU set is selected to serve as the quantization parameter "CTU_set_base_qp" for the current CTU set. Taking the CTU set 330 as the current CTU, the quantization parameter "CTU_set_base_qp" of the CTU set 330 is the larger one of "CTU_set_base_qp" of CTU set 320 and "current_row_qp" of CTU set 310. In addition, if the energy parameter of the CTU set is less than the energy parameter of the previous CTU set minus a threshold value, a smaller one between "CTU_set_base_qp" of the previous CTU set and "current_row_qp" of the first CTU set is selected to serve as the quantization parameter "CTU_set_base_qp" for the current CTU set. Taking the CTU set 330 as the current CTU, the quantization parameter "CTU_set_base_qp" of the CTU set 330 is the smaller one of "CTU_set_base_qp" of CTU set 320 and "current_row_qp" of CTU set 310.

In the CTU-level quantization parameter determination method, its determination method is similar to the above-mentioned CTU set-level quantization parameter determination method, which can adjust the quantization parameters of the CTUs by establishing a budget pool and a loan budget pool. For example, after the current CTU completes the encoding operation, if the loan budget pool lent the number of bits, or the actual number of bits of encoded data of the CTU is greater than the estimated number of bits, or the remaining bits of the budget pool decrease, it means that the quantization parameters used by the current CTU during processing through the quantization circuit 120 are relatively small as a whole, so the quantization parameter determination circuit 190 will increase the quantization parameter of a next CTU, wherein "next CTU" refers to the CTU immediately to the right of the current CTU. Similarly, if the remaining bits of the loan budget pool increases, or the actual number of bits of encoded data of the CTU is lower than the estimated number of bits, or the remaining bits of the budget pool increase, it means that the quantization parameters used by the current CTU during processing through the quantization circuit 120 are relatively large as a whole, so the quantization parameter determination circuit 190 will decrease the quantization parameter of a next CTU, wherein "next CTU" refers to the CTU immediately to the right of the current CTU. In one embodiment, the quantization parameter used by the current CTU can be obtained according to the quantization parameter used by the previous CTU and be adjusted by using contents of the above-mentioned budget pool or loan budget pool.

In addition, the quantization parameter determination circuit 190 further establishes two parameters: base_bytes_per_energy and bytes_per_energy, wherein base_bytes_per_energy represents the number of bits allocated for an unit of the energy parameter, and bytes_per_energy represents the number of bits allocated for the unit of the energy parameter in the CTU that has not yet been encoded, and the formula is described as follows.

$$\text{base\_bytes\_per\_energy} = \text{target\_row\_size}/\text{total\_row\_energy};$$

$$\text{bytes\_per\_energy} = \text{left\_row\_size}/\text{left\_row\_energy};$$

wherein target_row_size is a sum of the target number of bits of all CTUs, after encoding, on the row to which the CTU set 310 belongs, total_row_energy is a sum of the energy parameters of all CTUs on the row to which the CTU set 310 belongs, and left_row_size is sum of the target number of bits of CTU(s) that have not yet been encoded on the column to which CTU set 310 belongs, and left_row_energy is the sum of energy parameters of all CTUs that have not yet been encoded on the row to which the CTU set 310 belongs.

In one embodiment, for a current CTU, if base_bytes_per_energy is less than left_row_energy, it means that the remaining number of bits is insufficient, that is, the number of remaining bits of the budget pool shown in FIG. 4 may be insufficient, so the quantization parameter determination circuit 190 will not increase the quantization parameter of the current CTU (that is, the quantization parameter of the current CTU will not be greater than the quantization parameter of the previous CTU).

In one embodiment, if the energy parameter of the CTU to be encoded is greatly increased or decreased compared with the energy parameter of the previous CTU, the quantization parameter determination circuit 190 can further determine the quantization parameter used by the current CTU according to its energy parameter. Specifically, if the energy parameter of the CTU is greater than the energy parameter of the previous CTU plus a threshold value, a larger one between "CTU_set_base_qp" of the previous CTU set and "current_row_qp" of the first CTU set is selected to serve as the quantization parameter of the current CTU. Taking one CTU in the third column of CTU set 320 as the current CTU, its quantization parameter is the larger one of "CTU_set_base_qp" of CTU set 320 and "current_row_qp" of CTU set 310. In addition, if the energy parameter of the current CTU is less than the energy parameter of the previous CTU set minus a threshold value, a smaller one between "CTU_set_base_qp" of the previous CTU set and "current_row_qp" of the first CTU set is selected to serve as the quantization parameter of the current CTU. Taking one CTU in the third column of CTU set 320 as the current CTU, its quantization parameter is the smaller one of "CTU_set_base_qp" of CTU set 320 and "current_row_qp" of CTU set 310.

Figure 5:
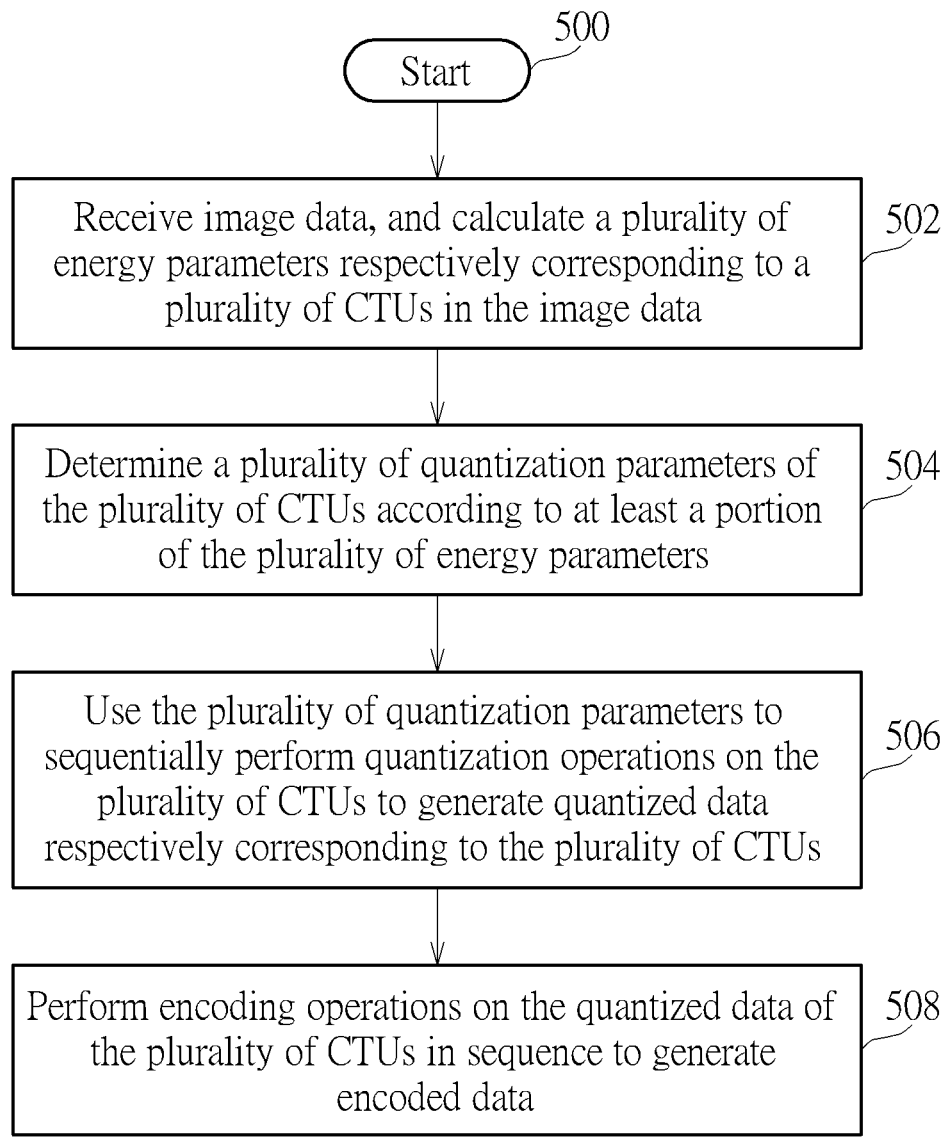
FIG. 5 is a flowchart of a signal processing method of an encoder according to one embodiment of the present invention.

FIG. 5 is a flowchart of a signal processing method of an encoder according to one embodiment of the present invention. Referring to the above embodiments shown in FIG. 1-FIG. 4, the flow of the signal processing method is described as follows.

Step 500: the flow starts.

Step 502: receive image data, and calculate a plurality of energy parameters respectively corresponding to a plurality of CTUs in the image data.

Step 504: determine a plurality of quantization parameters of the plurality of CTUs according to at least a portion of the plurality of energy parameters.

Step 506: Use the plurality of quantization parameters to sequentially perform quantization operations on the plurality of CTUs to generate quantized data respectively corresponding to the plurality of CTUs.

Step 508: perform encoding operations on the quantized data of the plurality of CTUs in sequence to generate encoded data.

Briefly summarized, in the encoder and related operations of the present invention, the bit rate of the encoder can be effectively controlled by combining multiple CTUs into a CTU set, and using a row of CTU sets to control the target number of bits. In addition, by using the quantization parameter determination circuit to adopt different quantization parameter determination methods for different CTUs, each CTU can have the most suitable quantization parameters, so that the bit rate control of the encoder is more accurate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An encoder, comprising:
   a quantization circuit, configured to perform quantization operations on a plurality of coding tree units (CTUs) in image data in sequence to generate quantized data respectively corresponding to the plurality of CTUs;
   an encoding circuit, configured to perform encoding operations on the quantized data of the plurality of CTUs in sequence to generate encoded data;
   an energy parameter calculation circuit, configured to receive the image data, and calculate a plurality of energy parameters respectively corresponding to the plurality of CTUs in the image data; and
   a quantization parameter determination circuit, configured to determine a plurality of quantization parameters of the plurality of CTUs according to at least a portion of the plurality of energy parameters, for the quantization circuit to perform the quantization operations on the plurality of CTUs in sequence.

2. The encoder of claim 1, wherein for each CTU, the energy parameter calculation circuit calculates a variation of a plurality of pixel values in the CTU to generate the energy parameter of the CTU.

3. The encoder of claim 2, wherein if the image data belongs to an intra-frame (I-frame), the energy parameter calculation circuit generates the energy parameter of the CTU according to the variation of the plurality of pixel values in the CTU; and if the image data belongs to a predicted frame (P-frame), the energy parameter calculation circuit further calculates a sum of absolute difference (SAD) between the plurality of pixel values of the CTU and corresponding pixel values in a reference frame, and calculates the energy parameter of the CTU according to the variance and the SAD.

4. The encoder of claim 1, wherein the plurality of CTUs form a row of CTU sets, each CTU set comprises N*M CTUs, and N and M are positive integers greater than or equal to two; and for each CTU, the quantization parameter determination circuit determines to adopt a row-level quantization parameter determination method, a CTU-level quantization parameter determination method or a CTU set-level quantization parameter determination method to calculate the quantization parameter of the CTU according to a position of the CTU in the row of CTU sets.

5. The encoder of claim 4, wherein if the CTU is located in the first column of the row of CTU sets, the quantization parameter determination circuit uses the row-level quantization parameter determination method to calculate the quantization parameter of the CTU.

6. The encoder of claim 5, wherein the quantization parameter determination circuit calculates the quantization parameter of the CTU according to a target number of bits of the row of CTU sets after encoding and an average value of the energy parameters of the plurality of CTUs of the row of CTU sets.

7. The encoder of claim 4, wherein if the CTU is located in the first row of all CTU sets except the first CTU set in the row of CTU sets, the quantization parameter determination circuit uses the CTU set-level quantization parameter determination method to calculate the quantization parameter of the CTU.

8. The encoder of claim 7, wherein the CTU is located in a second CTU set, and the second CTU set is located after a first CTU set; and the quantization parameter determination circuit determines the quantization parameter of the CTU according to an actual number of bits of the first CTU set after encoding and an estimated number of bits of the first CTU set before encoding.

9. The encoder of claim 8, wherein if the CTU is not located in the first column of any CTU set, the quantization parameter determination circuit uses the CTU-level quantization parameter determination method to calculate the quantization parameter of the CTU.

10. The encoder of claim 9, wherein the CTU is a second CTU, and the second CTU is located after a first CTU; and the quantization parameter determination circuit determines the quantization parameter of the CTU according to an actual number of bits of the first CTU after encoding and an estimated number of bits of the first CTU before encoding.

11. A signal processing method of an encoder, comprising:
receiving image data, and calculating a plurality of energy parameters respectively corresponding to a plurality of CTUs in the image data;
determining a plurality of quantization parameters of the plurality of CTUs according to at least a portion of the plurality of energy parameters;
using the plurality of quantization parameters to sequentially perform quantization operations on the plurality of CTUs to generate quantized data respectively corresponding to the plurality of CTUs; and
performing encoding operations on the quantized data of the plurality of CTUs in sequence to generate encoded data.

12. The signal processing method of claim 11, wherein the step of calculating the plurality of energy parameters respectively corresponding to the plurality of CTUs in the image data comprises:
for each CTU, calculating a variation of a plurality of pixel values in the CTU to generate the energy parameter of the CTU.

13. The signal processing method of claim 12, wherein the step of calculating the plurality of energy parameters respectively corresponding to the plurality of CTUs in the image data comprises:
if the image data belongs to an intra-frame (I-frame), generating the energy parameter of the CTU according to the variation of the plurality of pixel values in the CTU; and
if the image data belongs to a predicted frame (P-frame), calculating a sum of absolute difference (SAD) between the plurality of pixel values of the CTU and corresponding pixel values in a reference frame, and calculating the energy parameter of the CTU according to the variance and the SAD.

14. The signal processing method of claim 11, wherein the plurality of CTUs form a row of CTU sets, each CTU set comprises N*M CTUs, and N and M are positive integers greater than or equal to two; and the step of determining the plurality of quantization parameters of the plurality of CTUs according to at least a portion of the plurality of energy parameters comprises:
for each CTU, determining to adopt a row-level quantization parameter determination method, a CTU-level quantization parameter determination method or a CTU set-level quantization parameter determination method to calculate the quantization parameter of the CTU according to a position of the CTU in the row of CTU sets.

15. The signal processing method of claim 14, wherein the step of determining the plurality of quantization parameters of the plurality of CTUs according to at least a portion of the plurality of energy parameters comprises:
if the CTU is located in the first column of the row of CTU sets, using the row-level quantization parameter determination method to calculate the quantization parameter of the CTU.

16. The signal processing method of claim 15, wherein the step of determining the plurality of quantization parameters of the plurality of CTUs according to at least a portion of the plurality of energy parameters comprises:
calculating the quantization parameter of the CTU according to a target number of bits of the row of CTU sets after encoding and an average value of the energy parameters of the plurality of CTUs of the row of CTU sets.

17. The signal processing method of claim 14, wherein the step of determining the plurality of quantization parameters of the plurality of CTUs according to at least a portion of the plurality of energy parameters comprises:
if the CTU is located in the first row of all CTU sets except the first CTU set in the row of CTU sets, using the CTU set-level quantization parameter determination method to calculate the quantization parameter of the CTU.

18. The signal processing method of claim 17, wherein the CTU is located in a second CTU set, and the second CTU set is located after a first CTU set; and the step of determining the plurality of quantization parameters of the plurality of CTUs according to at least a portion of the plurality of energy parameters comprises:
determining the quantization parameter of the CTU according to an actual number of bits of the first CTU set after encoding and an estimated number of bits of the first CTU set before encoding.

19. The signal processing method of claim 18, wherein the step of determining the plurality of quantization parameters of the plurality of CTUs according to at least a portion of the plurality of energy parameters comprises:
if the CTU is not located in the first column of any CTU set, using the CTU-level quantization parameter determination method to calculate the quantization parameter of the CTU.

20. The signal processing method of claim 19, wherein the CTU is a second CTU, and the second CTU is located after a first CTU; and the step of determining the plurality of quantization parameters of the plurality of CTUs according to at least a portion of the plurality of energy parameters comprises:
determining the quantization parameter of the CTU according to an actual number of bits of the first CTU after encoding and an estimated number of bits of the first CTU before encoding.

* * * * *